C. W. STEELE.
EXHAUST HEATED STEERING WHEEL.
APPLICATION FILED JAN. 12, 1918. RENEWED FEB. 13, 1919.

1,315,251.

Patented Sept. 9, 1919.

Inventor
C. W. Steele
By H. S. Hill
Attorney

UNITED STATES PATENT OFFICE.

CLYDE W. STEELE, OF YOUNGSTOWN, OHIO, ASSIGNOR OF ONE-HALF TO F. C. McLAUGHLIN, OF YOUNGSTOWN, OHIO.

EXHAUST-HEATED STEERING-WHEEL.

1,315,251.      Specification of Letters Patent.      Patented Sept. 9, 1919.

Application filed January 12, 1918, Serial No. 211,543. Renewed February 13, 1919. Serial No. 276,867.

*To all whom it may concern:*

Be it known that I, CLYDE W. STEELE, a citizen of the United States, residing at Youngstown, in the county of Mahoning, State of Ohio, have invented a new and useful Exhaust-Heated Steering-Wheel; and I do hereby declare the following to be a full, clear, and exact description of the invention, such as will enable others skilled in the art to which it appertains to make and use the same.

The present invention relates to an exhaust heated steering wheel, and has for its object to provide a device of this character which embodies novel features of construction whereby the exhaust gases from the engine can be caused to circulate through the rim of the steering wheel for warming the same so that the hands of the driver will not get cold while operating the machine.

Further objects of the invention are to provide an exhaust heated steering wheel which is comparatively simple and inexpensive in its construction, which can be used in the same manner as an ordinary steering wheel, and which will not interfere in any manner with the operation of the engine or the control of the driver over the vehicle.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Corresponding and like parts are referred to in the following description and indicated in all the views of the drawings by the same reference characters.

Figure 1:
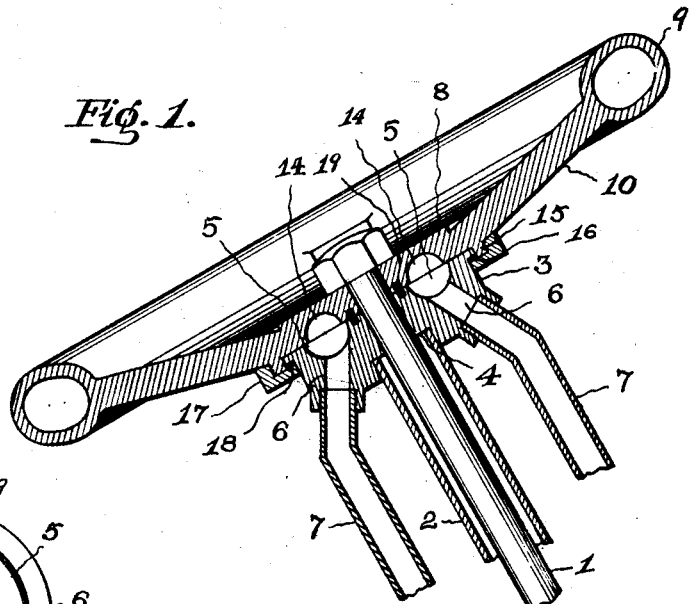
Figure 1 is a sectional view through an exhaust heated steering wheel constructed in accordance with the invention.
Figure 3:
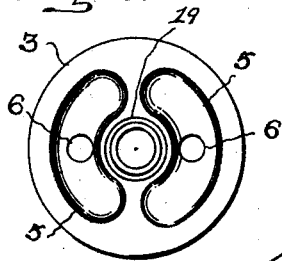
Fig. 3 is a top plan view of the head which is fitted on the upper end of the steering post.
Figure 2:
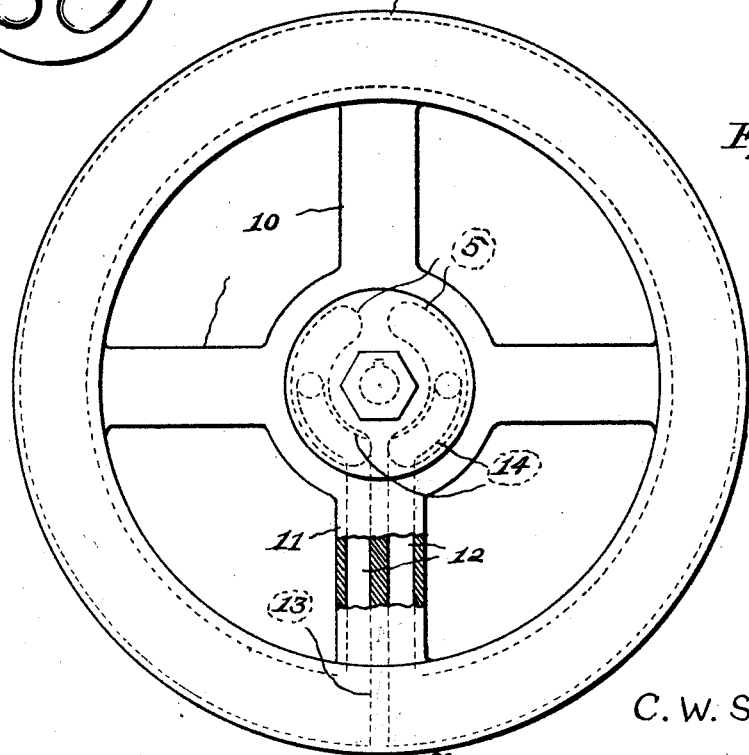
Fig. 2 is a top plan view of the wheel with a portion broken away and shown in section.

Referring to the drawings, the numeral 1 designates the usual steering rod and 2 the steering rod housing or post. A circular head 3 is fitted upon the upper end of the steering rod housing, being recessed at 4 to receive the same, and having a flat upper face. A pair of opposed and segmental recesses 5 are formed in the flat upper face of the head 3 on opposite sides of the opening through which the steering rod passes, said recesses being in communication with passages 6 which extend downwardly through the bottom of the head and communicate with the respective circulation pipes 7. These pipes 7 may either be rigid or flexible and extend downwardly to the regular exhaust pipe of the engine, where a conventional cut-out is provided for causing the exhaust gases either to follow their usual course through the muffler or to pass through the steering wheel.

The steering wheel includes a hub 8 which is keyed or otherwise rigidly fastened in a conventional manner to the steering rod 1 and has a flat lower face which rests rotatably upon the flat upper face of the head. The rim 9 has a tubular formation and is connected to the hub by spokes 10 and 11. The spokes 10 are solid, while the spoke 11 is provided with a pair of circulation passages 12 which lead from the hub to the tubular rim and communicate with the interior of the tubular rim on opposite sides of a transverse partition 13 extending across the same. The inner ends of the passages 12 communicate with diverging ducts 14 which are formed in the hub 8 and open downwardly through the flat lower face of the hub so as to remain in communication with the respective segmental recesses 5 of the head 3 during the usual rotation of the steering wheel when directing the movements of the vehicle.

The hub 8 is shown as formed with a downwardly extending annular rib 15 which surrounds and closely engages a flange 16 projecting from the periphery of the head 3. A flanged retaining ring 17 may be screwed upon the rib 15 in such a manner as to coöperate with the flange 16 to retain the head and hub of the wheel in a close engagement with each other at all times. Suitable packing 18 may be interposed between the retaining ring 17 and flange 16 to provide a tight joint and render it impossible for any of the gases to escape through the joint. In a similar manner an annular packing ring 19 may be arranged in the space between the segmental recesses 5 and the steering rod 1, being fitted in corresponding annular seats formed in the adjacent faces of the hub 8 and head 3. The exhaust gases will thus be properly confined within the passages and it will be impossible for them to escape through the joints as the steering wheel is rotated back and forth in the necessary manner for directing the movements of the vehicle.

When the valve or cut-out device on the exhaust pipe of the engine is set for causing the steering wheel to be heated, the hot exhaust gases will enter one of the segmental recesses 5 of the head through one of the circulation pipes 7, and leave the opposite recess 5 through the other pipe 7. From the first mentioned segmental recess 5 the hot exhaust gases will enter the tubular rim 9 of the steering wheel on one side of the partition 13 through one of the ducts 14 and passages 12. These exhaust gases will circulate entirely around the rim of the wheel and leave the same through the opposite passage 12 and duct 14. It will be understood that the passage of these hot exhaust gases from the engine through the rim of the steering wheel will cause the same to be heated so that the hands of the driver will not get cold while operating the vehicle in disagreeable weather.

Having thus described the invention, what I claim as new and desire to secure by Letters Patent, is:—

In a device of the character described, the combination with a steering rod housing, of a circular head fitted thereon and having a flat upper face provided with an annular seat and also with a pair of concentric segmental recesses arranged exteriorly of the annular seat, a laterally projecting annular flange extending around the head, circulation pipes leading to the bottom of the head and in communication with the respective segmental recesses, a hub having a flat lower face which rests rotatably upon the flat upper face of the head and is provided with a corresponding annular seat, said hub being surrounded by a downwardly projecting annular rib which rotatably engages the flange of the head and being formed with a pair of ducts which open through the flat lower face of the hub and are arranged to remain in communication with the respective segmental recesses of the head as the hub is oscillated back and forth, an annular retaining ring removably mounted upon the rib of the hub and coöperating with the flange of the head to hold the hub and head in a close engagement with each other, packing interposed between the retaining ring and the flange of the head, packing fitted in the corresponding seats of the hub and head, a tubular wheel rim, and a spoke connection between the rim and hub, said connection being formed with circulation passages leading from the respective ducts of the hub to the interior of the tubular rim.

In testimony whereof I have signed my name to this specification in the presence of two subscribing witnesses.

CLYDE W. STEELE.

Witnesses:
L. J. BURT,
COLONEL STEELE.

Copies of this patent may be obtained for five cents each, by addressing the "Commissioner of Patents, Washington, D. C."